United States Patent [19]

Foa' et al.

[11] Patent Number: 5,003,028

[45] Date of Patent: Mar. 26, 1991

[54] THERMOPLASTIC LINEAR AROMATIC POLYETHERDIKETONES AND PROCESS FOR OBTAINING SAME

[75] Inventors: Marco Foa'; Elena Bencini, both of Novara, Italy

[73] Assignee: Montedison S.p.A, Milan, Italy

[21] Appl. No.: 349,944

[22] Filed: May 8, 1989

Related U.S. Application Data

[63] Continuation of Ser. No. 934,907, Nov. 25, 1986, abandoned.

[30] Foreign Application Priority Data

Dec. 2, 1985 [IT] Italy .................................. 23056 A/85

[51] Int. Cl.⁵ .......................... C08C 2/00; C08C 8/02; C08C 14/00; C08G 65/38
[52] U.S. Cl. .............................. 528/125; 528/126; 528/219; 528/220
[58] Field of Search ................ 528/125, 126, 219, 220

[56] References Cited

U.S. PATENT DOCUMENTS 3,594,446 7/1971 Gabler et al. ...................... 528/125
4,105,636 8/1978 Taylor ................................ 528/125

FOREIGN PATENT DOCUMENTS 1909441 2/1969 Fed. Rep. of Germany .
2359867 7/1977 France .

Primary Examiner—John Kight, III
Assistant Examiner—P. Hampton-Hightower
Attorney, Agent, or Firm—Stevens, Davis, Miller & Mosher

[57] ABSTRACT

Thermoplastic linear aromatic polyetherdiketones containing repeating units of formula:

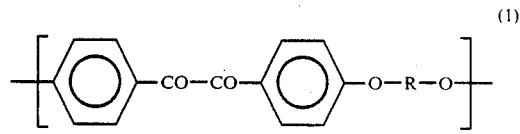

(1)

wherein R is an arylene radical containing from 1 to 3 aromatic rings directly joined among them, or condensed, or joined by one or more of the following difunctional groups:

—O—, —CO—; —CO—CO—, —SO$_2$—,
—C(CH$_3$)$_2$—, —C(CF$_3$)$_2$—.

16 Claims, No Drawings

THERMOPLASTIC LINEAR AROMATIC POLYETHERDIKETONES AND PROCESS FOR OBTAINING SAME

This application is a continuation of U.S. Pat. application Ser. No. 934,907, filed Nov. 25, 1986 now abandoned.

DESCRIPTION OF THE INVENTION

The present invention relates to thermoplastic linear aromatic polyetherdiketones and to the process for obtaining them.

More particularly the present invention relates to thermoplastic linear aromatic polyetherdiketones, and corresponding copolymers, containing in the repeating units a diketone group —CO—CO—.

There are already known in the literature, namely in Polish Patent No. 117,224, oligomers containing in the repeating unit a diketone group. However, in these oligomers the repeating unit containing the diketone group repeats only from 2 to 4 times.

It has now, surprisingly, been found, and these are objects of the present invention, thermoplastic linear aromatic polyetherdiketones having high molecular weights and containing repeating units of the formula:

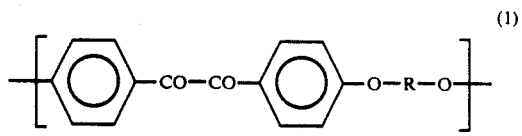

wherein R is an arylene radical containing from 1 to 3 aromatic rings directly joined among them, or condensed, or joined by one or more of the following difunctional groups:

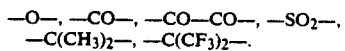

The polymers of the present invention may, according to the nature of the R group, be crystalline or amorphous.

In the event that it is able to crystalline, the crystallinity measured by X-ray diffraction may reach 60% by volume.

These polymers show a high thermal stability detectable both by thermogravimetric measurements and from the lack of molecular weight alterations. The properties of the polymers make them particularly suitable for use in manufactured articles which are either continuously or at intervals subjected to mechanical, static or dynamic stresses, even at high temperatures.

In particular, the polymers of the present invention may be used for obtaining manufactured articles prepared according to the generally used processing techniques for thermoplastic polymers such as, for instance, molding and extrusion. They may be worked in the form of film or fiber or they may be used as a matrix for composite materials based on fiber or fillers. They may also be used for preparing mixtures with other polymers.

The polymers of the present invention may also be used in the field of structural adhesives or for covering surfaces.

The polymers of the present invention have an inherent viscosity, measured in 96% sulfuric acid, higher than 0.2 dl/g, in particular between 0.2 and 2 dl/g, and, preferably, between 0.4 and 1.5 dl/g.

The polymers may be characterized either by the same repeating units or by two or more types of units which differ among themselves by changing the radical R.

A further object of the present invention is a process for the preparation of the thermoplastic linear aromatic polyetherdiketones comprising repeating units of the formula (1).

According to said process, dihalide compounds, or mixtures thereof, having the general formula:

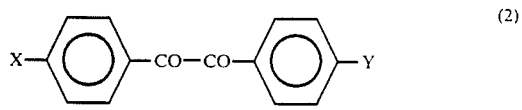

wherein X and Y, being the same or different, represent a halogen such as fluorine or chlorine, are reacted with bisphenols or mixtures thereof, of the formula:

wherein R has the same meaning as indicated above, in equimolar ratios, in the presence of salifying agents such as carbonates and bicarbonates of alkaline metals, and in a solvent.

Any carbonate and/or bicarbonate of an alkaline metal may be used for the polycondensation reaction, but preferred are potassium carbonate and/or bicarbonate or sodium carbonate or bicarbonate, used alone or in admixtures.

The above-mentioned salts are reacted with the bisphenol of formula (3) in ratios between the stoichiometric ratio and double the stoichiometric ratio.

Alternatively, alkaline salts of bisphenols (3) prepared separately, according to per se known techniques, may be directly used.

The polycondensation reaction which is one of the objects of the present invention is carried out in the presence of a solvent, and under substantially anhydrous conditions, and the water released during the salification of bisphenol in situ with the alkaline carbonates and/or bicarbonates is removed by a nitrogen stream or by azeotropic distillation.

The temperature is between 180° and 320° C. and may vary within these limits during the polycondensation; however the preferred temperatures are between 220° and 300° C.

The polycondensation solvent is selected in such a manner as to have a boiling temperature compatible with the reaction temperature, a good polarity, and a good solubility both for the reactants and for the final products.

Diarylsulfones and sulfoxides, such as diphenylsulfone and diphenylsulfoxide, and aromatic nitro derivatives such as nitrobenzene, have proved to be suitable solvents.

The process enables one to prepare polymers in a wide range of molecular weights as shown by the measurement of the inherent viscosity obtained in 96% sulfuric acid at 0.5% concentration and at 30° C. The polymers thus obtained show a viscosity between 0.2 and 2 dl/g, and preferably between 0.4 and 1.5 dl/g.

The polymer is recovered from the solution at the end of the reaction by known methods, such as, for instance, by cooling and subsequent precipitation, by evaporation, or by precipiatation with a non-solvent and subsequent filtration.

The dihalides of formula (2) are per se known compounds. They may be obtained, e.g., by benzoinic condensation as described in "Organic Reactions", U.S. Pat. No. 4,269,1948.

Examples of bisphenols particularly suitable for the polycondensation according to the present invention are hydroquinone, 4-4'-di-hydroxydiphenyl, 4-4'dihydroxydiphenylether, 4-4'-dihydroxybenzophene, 4-4'-dihydroxydibenzoyl, 4,4'-dihydroxyphenylsulfone, bisphenol A and bisphenol A-F.

Any dihalide of the formula (2) may be used for the polycondensation reaction, although the corresponding fluorinated and/or chlorinated compounds are preferred.

Examples of dihalides suitable for the polycondensation reaction of the present invention are: 4,4'-difluorodibenzoyl; 4,4'-chlorofluoridibenzoyl; 4,4'-dichlorodibenzoyl, etc.

EXAMPLES

To still better understand the present invention and to practically perform the same, there follow some illustrative (but not limitative) examples:

EXAMPLE 1

Into a 5-necked, round-bottomed flask, provided with mechanical agitator, thermometer, cooler, and pipe for the introduction of gas, there are introduced under nitrogen 200 g (0.812 moles) of 4-4'difluorodibenzoyl, 89.35 g (0.812 moles) of hydroquinone, and 508 g of diphenylsulfone. The mixture is heated at 180° C. under stirring and at this temperature, under a nitrogen stream, 114 g (0.826 moles) of anhydrous $K_2CO_3$ are introduced. The temperature is raised to 200° C. and after 1 hour is raised to 250° C. and after a further hour to 290° C. The water and carbon dioxide formed during the reaction are removed.

The polymerization is terminated after having kept the mixture for one hour at 290° C. The mixture is cooled, the solid then obtained is milled, washed with acetone, water and acetone, and finally with methanol.

After drying under vacuum at 140° C., 240 g of polymer are obtained having the following repeating unit:

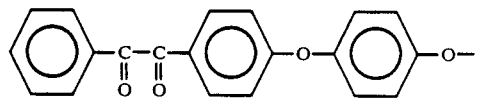

The polymer shows an inherent viscosity of 0.60, measured in 96% $H_2SO_4$. The glass transition temperature of the polymer Tg is 152° C., and the melting temperature Tm is 312° C. The crystallinity is 31%.

Using the powdered polymer, some laminae were prepared which were compression molded at a temperature of 350° C. and cooled. By cooling the laminae at the rate of about 100° C./min, an amorphous product is obtained.

Samples have been obtained from these laminae; these samples were then mechanically characterized by obtaining the following data:

| $\sigma_y$(Kg/cm$^2$) | $\epsilon_y$(%) | $\sigma_\beta$(Kg/cm$^2$) | $\epsilon_\beta$(%) |
|---|---|---|---|

-continued

| | | | |
|---|---|---|---|
| Tensile stress tests | 965 | 7.5 | 790 | 23 |

| | E(Kg/cm$^2$) | $\sigma_{max}$(Kg/cm$^2$) | $\epsilon_\sigma$max (%) |
|---|---|---|---|
| Bending tests | 32,000 | 1,612 | 8 |

After firing at 258° C. for 4 hours and cooling at 1°-2° C./min, the sample shows a crystalline, when measured by X-ray absorption, equal to 21%. The mechanical characteristics of the fired sample are as follows:

| | $\sigma_\beta$(Kg/cm$^2$) | | $\epsilon_\beta$(%) |
|---|---|---|---|
| Tensile stress tests | 1250 | | 10 |
| | E(Kg/cm$^2$) | $\sigma_{max}$ | $\epsilon_\sigma$max(%) |
| Bending tests | 44,300 | 2,150 | 59 |

EXAMPLE 2

Into a 250 ml round-bottomed flask, provided with mechanical stirrer, thermometer, pipe for the introduction of gas, and Dean-Stark type apparatus for the separation of water, there are introduced under a nitrogen stream 10 g (0.0346 mol) of 4,4'-dichlorodibenzoyl, 3.8 g (0.0346 mol) of hydroquinone, 5.52 g(0.040 mol) of anhdrous $K_2CO_3$, 30 g of diphenylsulfone, and 20 ml of toluene for the azeotropic distillation of water.

After having filled the Dean-Stark apparatus with toluene, the heating is started, under nitrogen flow, while stirring the reaction mass.

The boiling temperature of the mixture is progressively increased from 130° up to about 230° C. while progressively tapping the water-toluene azeotrope and successively all the toluene through the Dean-Stark apparatus. The duration of this first step is about 3 hours. The temperature is then increased to 250° C. and kept there for 1 hour in order to complete the polymerization. The mixture is then cooled and the polymer is recovered according to the procedures of the preceding example.

10.8 g of polymer are separated having an inherent viscosity, measured in 96% $H_2SO_4$, equal to 1.07; the Tg is 155° C., the Tm is 300° C., and the crystallinity is 25%.

EXAMPLE 3

In the same apparatus of Example 1, and according to the same procedures, there are introduced 27.6 g (0.112 mol) of 4,4'-di-fluorodibenzoyl, 2.71 g (0.011 mol) of 4,4'-dihydroxydibenzoyl, 11.19 g (0.101 mol) of hydroquinone, and 77 g of diphenylsulfone. The temperature is raised to 180° C. and 16 g of anhydrous $K_2CO_3$ (0.115 mol) are added.

By working according to the procedures described in Example 1, a copolymer is separated having the following repeating units:

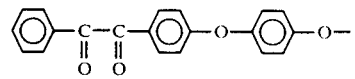

and

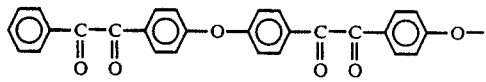

The inherent viscosity of the copolymer, when measured in chloronaphthalene at 200° C., is 0.51, corresponding to a viscosity equal to 0.6 when measured in 96% $H_2SO_4$; the Tg is 156° C., the Tm is 284° C., and the crystallinity is 24%.

EXAMPLE 4

Into a 500 ml round-bottomed flask provided with mechanical stirrer, thermometer, pipe for the introduction of gas, and condenser for the solvent, there are introduced, under nitrogen flow, 4.1 g of 4,4'-difluorodibenzoyl (0.0166 mol), 3.1 g of 4,4'-dihydroxydiphenyl (0.0166 mol), 5 g of anhydrous potassium carbonate (0.036 mol), and 100 ml of nitrobenzene. The temperature is raised up to the boiling temperature by keeping a slight nitrogen flow. The condensed solvent is allowed to go through molecular sieves before being recycled in the reaction flask.

After 5 hours, the polymerization is interrupted. The mixture cooled to room temperature is additioned with acetone and concentrated HCl. The precipitated polymer is filtered and washed with $H_2O$ and acetone.

After drying for 3 hours at 130°–140° C., 5.4 g of polymer are obtained having the following repeating unit:

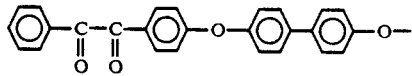

The inherent viscosity in 96% $H_2SO_4$ of the obtained polymer is 1.07; the Tg is 178° C.; the Tm is 272° C., and the crystallinity is 37%.

EXAMPLE 5

Into the same apparatus described in the preceding example, and according to the same procedures, 9.90 g of 4,4-di-fluorodibenzoyl (0.040 mol), 8.2 g of 4,4'-dihydroxydiphenylether (0.040 mol), 11 g of $K_2CO_3$ (0.08 mol), and 240 of nitrobenzene are introduced.

By working according to the procedures described in the preceding example, 12.5 g of polymer are obtained having the following repeating unit:

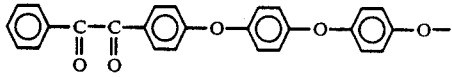

The inherent viscosity of the polymer, when measured in 96% $H_2SO_4$ is 0.75; the Tg is 146° C.; the Tm is 256° C., and the crystallinity is 16%.

EXAMPLE 6

Into the same apparatus described in Example 4, and according to the same procedures, there are introduced 9.84 g of 4,4'-difluorodibenzoyl (0.04 mol), 8.6 g of 4,4'-dihydroxybenzophenone (0.04 mol), 11 g (0.08 mol) of anhydrous $K_2CO_3$, and 240 ml of nitrobenzene.

By working according to the same procedures described in Example 4, 14 g of polymer are obtained having the following repeating unit:

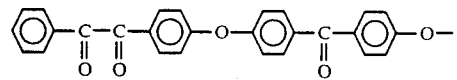

and showing the following characteristics:
inherent viscosity, measured in 96% $H_2SO_4$, equal to 0.37; Tg=148° C.; Tm=289° C., and crystallinity 36%.

Although the invention has been described in conjunction with specific embodiments, it is evident that many alternatives and variations will be apparent to those skilled in the art in light of the foregoing description. Accordingly, the invention is intended to embrace all of the alternatives and variations that fall within the spirit and scope of the appended claims. The above reference are hereby incorporated by reference.

What is claimed is:

1. Thermoplastic linear aromatic polyetherdiketones having a high molecular weight, consisting essentially of repeating units of the formula:

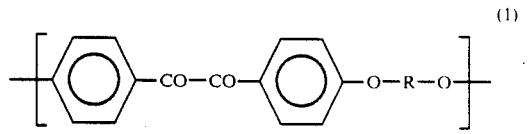

wherein R is an arylene radical containing from 1 to 2 aromatic rings directly joined among them, or condensed, or joined by one or more of the following difunctional groups:

$-O-$, $-CO-$, $-CO-CO$, $-SO_2-$, $-C(CH_3)_2-$, $-C(CF_3)_2-$.

and having an intrinsic viscosity in 96% sulfuric acid higher than 0.2 dl/g.

2. Aromatic polyetherdiketones according to claim 1, further consisting essentially of a crystalline structure which reaches 60% by volume.

3. Aromatic polyetherdiketones according to claim 1 or claim 2, further consisting essentially of an intrinsic viscosity between 0.2 and 2 dl/g.

4. Aromatic polyetherdiketones according to claim 3, further consisting essentially of an intrinsic viscosity between 0.4 and 1.5 dl/g.

5. A process for the preparation of thermoplastic, linear aromatic polyetherdiketones as defined in claim 1, comprising reacting dihalides of the formula:

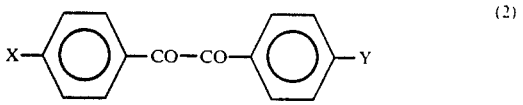

wherein X and Y, equal to or different, represent a halogen, with bisphenols of the general formula:

HO—R—OH 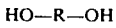

wherein R has the same above-described meaning, in equimolar ratios, in the presence of salifying agents such as carbonates and/or bicarbonates of alkaline metals, and in a solvent.

6. A process according to claim 5, wherein mixtures of dihalides of the formula (2) are used.

7. A process according to claim 5 or claim 6, wherein mixtures of bisphenols of the formula (3) are used.

8. A process according to claim 5 or claim 6, wherein the carbonate and/or bicarbonate of the alkaline metal is fed to the reaction in ratios relative to the bisphenol of formula (3) between the stoichiometric ratio and double the stoichiometric ratio.

9. Process according to claim 5, wherein the reaction is carried out in the presence of potassium or sodium carbonate and/or bicarbonate, alone or in admixture.

10. Process according to claim 5, wherein alkaline salts of bisphenols of the formula (3) are directly used.

11. Process according to claim 5, wherein the reaction is carried out at a temperature between 100° and 320° C.

12. Process according to claim 5, wherein the solvent is selected in such a manner as to have a boiling temperature compatible with the reaction temperature, a good polarity, and a good solubility both for the reactants and for the final products.

13. Process according to claim 12, wherein the solvent is selected from diarylsulfones and sulfoxides and nitro-derivatives.

14. Process according to claim 12, wherein the solvent is selected from diphenylsulfone, diphenylsulfoxide, and nitrobenzene.

15. Process according to claim 5, wherein the dihalides of formula (2) are selected from the corresponding fluorinated and/or chlorinated compounds.

16. Process according to claim 11, wherein the temperature is between 220° and 300° C.

* * * * *